United States Patent
Muralidharan et al.

(10) Patent No.: US 11,816,671 B2
(45) Date of Patent: Nov. 14, 2023

(54) DYNAMIC VERIFICATION METHOD AND SYSTEM FOR CARD TRANSACTIONS

(71) Applicant: MIR Limited, Douglas (IM)

(72) Inventors: Venkatesa Prasannaa Muralidharan, Onchan (IM); Shanmuhanathan Thiagaraja, Reading (GB)

(73) Assignee: RTEKK HOLDINGS LIMITED, Douglas (IM)

( * ) Notice: Subject to any disclaimer, the term of this patent is extended or adjusted under 35 U.S.C. 154(b) by 0 days.

(21) Appl. No.: 16/695,337

(22) Filed: Nov. 26, 2019

(65) Prior Publication Data

US 2020/0167793 A1 May 28, 2020

Related U.S. Application Data

(60) Provisional application No. 62/771,205, filed on Nov. 26, 2018.

(51) Int. Cl.
*G06Q 20/40* (2012.01)
*G06Q 20/32* (2012.01)

(52) U.S. Cl.
CPC ....... *G06Q 20/4018* (2013.01); *G06Q 20/326* (2020.05); *G06Q 20/4012* (2013.01); *G06Q 20/40145* (2013.01)

(58) Field of Classification Search
None
See application file for complete search history.

(56) References Cited

U.S. PATENT DOCUMENTS

| | | | | |
|---|---|---|---|---|
| 5,984,191 A * | 11/1999 | Chapin, Jr. | ...... | G06K 19/06187 235/487 |
| 7,860,789 B2 * | 12/2010 | Hirka | ...... | G06Q 20/20 705/41 |
| 7,878,394 B2 * | 2/2011 | Johnson | ...... | G06Q 20/40 235/487 |
| 8,010,428 B2 | 8/2011 | Maw et al. | | |
| 8,191,766 B2 * | 6/2012 | Tomchek | ...... | G06Q 20/10 235/376 |
| 8,412,604 B1 * | 4/2013 | Graham | ...... | G06Q 40/02 705/40 |
| 8,930,273 B2 | 1/2015 | Varadarajan | | |
| 9,070,105 B2 * | 6/2015 | Krause | ...... | G06Q 20/4016 |

(Continued)

FOREIGN PATENT DOCUMENTS

| | | |
|---|---|---|
| WO | 2011127177 A2 | 10/2011 |
| WO | 2015002833 A1 | 1/2015 |

(Continued)

OTHER PUBLICATIONS

O. Dandash, P. Dung Le and B. Srinivasan, "Internet banking payment protocol with fraud prevention," 2007 22nd international symposium on computer and information sciences, Ankara, Turkey, 2007, pp. 1-6,(Internet Banking) (Year: 2007).*

(Continued)

*Primary Examiner* — Joseph W. King
(74) *Attorney, Agent, or Firm* — KLIGLER & ASSOCIATES PATENT ATTORNEYS LTD

(57) ABSTRACT

Disclosed are methods and systems for payment card transactions, where a Card Verification Value (CVV) or Card Verification Code (CVC) is generated dynamically as part of a tokenized session.

19 Claims, 12 Drawing Sheets

(56) References Cited

U.S. PATENT DOCUMENTS

| | | | |
|---|---|---|---|
| 9,070,128 B1* | 6/2015 | Adams | G06Q 20/385 |
| 9,183,554 B1* | 11/2015 | Courtright | G06Q 20/202 |
| 9,275,506 B1* | 3/2016 | Whitmore | G06Q 20/3572 |
| 9,691,059 B1* | 6/2017 | Courtright | G06Q 20/4016 |
| 9,818,136 B1* | 11/2017 | Hoffberg | G07F 17/32 |
| 9,830,582 B1* | 11/2017 | Barrett | G06Q 20/4037 |
| 10,185,922 B2* | 1/2019 | Gonen | G06Q 10/06 |
| 10,275,780 B1* | 4/2019 | McCullough | G06Q 20/387 |
| 11,170,388 B1* | 11/2021 | Violette | H04L 43/16 |
| 11,171,890 B1* | 11/2021 | Matthews | H04L 47/215 |
| 11,184,906 B1* | 11/2021 | Park | H04W 24/02 |
| 11,188,904 B2* | 11/2021 | Arora | G06Q 20/3227 |
| 2002/0062249 A1* | 5/2002 | Iannacci | G06Q 30/06 705/14.1 |
| 2003/0061157 A1* | 3/2003 | Hirka | G06Q 20/34 705/39 |
| 2003/0130955 A1* | 7/2003 | Hawthorne | G06Q 20/367 705/65 |
| 2003/0172040 A1* | 9/2003 | Kemper | G06Q 20/405 705/75 |
| 2005/0097039 A1* | 5/2005 | Kulcsar | G06Q 40/00 705/40 |
| 2005/0109838 A1* | 5/2005 | Linlor | G07F 7/0886 235/379 |
| 2005/0121513 A1* | 6/2005 | Drummond | G06Q 20/1085 235/379 |
| 2006/0149671 A1* | 7/2006 | Nix | G06Q 20/102 705/40 |
| 2006/0208065 A1* | 9/2006 | Mendelovich | G06Q 20/227 705/14.27 |
| 2007/0136573 A1* | 6/2007 | Steinberg | H04L 63/0853 713/155 |
| 2007/0219926 A1* | 9/2007 | Korn | G06Q 20/3823 705/67 |
| 2007/0252002 A1* | 11/2007 | Guillot | G06Q 20/12 235/380 |
| 2008/0082418 A1* | 4/2008 | Fordyce | G06Q 30/0234 705/14.1 |
| 2008/0099551 A1* | 5/2008 | Harper | G06Q 30/06 235/380 |
| 2008/0120234 A1* | 5/2008 | Jagatic | G06Q 20/22 705/44 |
| 2008/0154770 A1* | 6/2008 | Rutherford | G07F 7/1008 705/44 |
| 2008/0201264 A1* | 8/2008 | Brown | G06Q 20/385 705/67 |
| 2008/0222038 A1* | 9/2008 | Eden | G06Q 20/4016 705/44 |
| 2008/0277465 A1* | 11/2008 | Pletz | G06Q 20/40 235/379 |
| 2009/0070260 A1* | 3/2009 | Flitcroft | G06Q 20/4016 705/41 |
| 2009/0114717 A1* | 5/2009 | Johnson | G06Q 20/20 235/379 |
| 2009/0119204 A1* | 5/2009 | Akella | G06Q 20/357 705/39 |
| 2009/0173782 A1* | 7/2009 | Muscato | G06Q 20/40975 235/379 |
| 2009/0228365 A1* | 9/2009 | Tomchek | G06Q 20/10 707/E17.014 |
| 2010/0014717 A1* | 1/2010 | Rosenkrantz | G06K 9/6215 382/115 |
| 2010/0049659 A1* | 2/2010 | Cassone | G06F 21/32 705/64 |
| 2010/0264227 A1* | 10/2010 | Joyce | G06K 19/077 235/487 |
| 2010/0293093 A1* | 11/2010 | Karpenko | G06Q 20/40 709/204 |
| 2011/0125633 A1* | 5/2011 | Aaltonen | G06Q 20/227 705/39 |
| 2011/0184856 A1 | 7/2011 | Shakkarwar | |
| 2011/0184867 A1* | 7/2011 | Varadarajan | G06Q 20/04 235/382 |
| 2011/0225089 A1* | 9/2011 | Hammad | G07F 7/12 705/44 |
| 2011/0320358 A1* | 12/2011 | Harris | G06Q 20/042 705/45 |
| 2012/0059762 A1 | 3/2012 | Muscato | |
| 2012/0226565 A1* | 9/2012 | Drozd | G07F 7/0893 705/16 |
| 2012/0226582 A1 | 9/2012 | Hammad | |
| 2013/0086389 A1 | 4/2013 | Suwald | |
| 2014/0032723 A1* | 1/2014 | Nema | G06Q 10/00 709/220 |
| 2014/0122339 A1* | 5/2014 | Aabye | G06Q 20/3227 705/44 |
| 2014/0164235 A1 | 6/2014 | Allen et al. | |
| 2014/0263624 A1 | 9/2014 | Guillaud | |
| 2015/0127547 A1 | 5/2015 | Powell et al. | |
| 2015/0154597 A1* | 6/2015 | Bacastow | G06Q 20/322 705/72 |
| 2015/0371234 A1* | 12/2015 | Huang | G06Q 20/40975 705/44 |
| 2016/0048836 A1* | 2/2016 | Sabatier | H04L 63/10 705/44 |
| 2016/0277363 A1* | 9/2016 | Kaladgi | H04L 63/0428 |
| 2017/0076076 A1* | 3/2017 | Materna | H04L 63/0861 |
| 2017/0237734 A1* | 8/2017 | Hallenborg | H04W 12/069 726/7 |
| 2017/0323291 A1 | 11/2017 | Donga | |
| 2018/0181955 A1* | 6/2018 | Woods | G06Q 20/3821 |
| 2019/0188707 A1* | 6/2019 | Arora | G06Q 20/40 |
| 2020/0167793 A1* | 5/2020 | Muralidharan | G06Q 20/32 |
| 2020/0226608 A1 | 7/2020 | Muralidharan et al. | |
| 2021/0365648 A1* | 11/2021 | Gelinotte | G07F 17/32 |

FOREIGN PATENT DOCUMENTS

| | | |
|---|---|---|
| WO | 2015013522 A1 | 1/2015 |
| WO | 2015013548 A1 | 1/2015 |
| WO | 2015134385 A2 | 9/2015 |

OTHER PUBLICATIONS www.techtarget.com—card verification value (CVV) (Year: 2008).*
https://www.matchmove-pay-announces-exclusive-joint-promotion-with-agoda-corn-in-southeast-asia/.
https://flexm.com/sg/.
https://www.enterpriseinnovation.net/article/yes-bank-ties-matchmove-pay-tap-booming-e-commerce-market-india-543464835.
EP Application # 18806817.5 Search Report dated Mar. 12, 2020.
IN Application # 201914048170 Office Action dated Mar. 16, 2021.
EP Application # 19211517.8 Search Report dated Apr. 7, 2020.
EP Application # 19211517.8 Office Action dated Mar. 23, 2021.
International Application # PCT/IL2018/050143 Search Report dated Mar. 21, 2018.
"EMV—Payment Tokenisation Specification—Technical Framework," EMVCo, LLC, version 1.0, pp. 1-84, Mar. 2014.
EP Application # 18806817.5 Office Action dated Oct. 26, 2021.
CN Application # 2018800257286 Office Action dated Dec. 2, 2022.
U.S. Appl. No. 16/616,494 Office Action dated Dec. 23, 2022.
IL Application # 270742 Office Action dated Mar. 27, 2023.
AU Application # 2018273740 Office Action dated Mar. 30, 2023.
CN Application # 201880025728.6 Office Action dated Apr. 29, 2023.
EP Application # 18806817.5 Office Action dated May 31, 2023.
IN Application # 201917039008 Office Action dated Feb. 26, 2022.
IL Application # 270874 Office Action dated Feb. 28, 2022.
NZ Application # 760551 Office Action dated May 2, 2022.
U.S. Appl. No. 16/616,494 Office Action dated May 16, 2022.
U.S. Appl. No. 16/616,494 Office Action dated Aug. 10, 2022.
U.S. Appl. No. 16/616,494 Office Action dated Jul. 27, 2023.

* cited by examiner

DYNAMIC VERIFICATION METHOD AND SYSTEM FOR CARD TRANSACTIONS

CROSS-REFERENCES TO RELATED APPLICATIONS

This application is related to and claims priority from commonly owned U.S. Provisional Patent Application Ser. No. 62/771,205, entitled: Dynamic Verification Method and System for Card Transactions, filed on Nov. 26, 2018, the disclosure of which is incorporated by reference in its entirety herein.

TECHNICAL FIELD

The present invention is directed to secure card transactions.

BACKGROUND OF THE INVENTION

Traditionally on a card, such as a credit card 10, as shown in FIGS. 1A (front side 10a) and 1B (rear side 10b), the CVV (Card Verification Value)/CVC (Card Verification Code) is a three digit code 15. The CVV/CVC is printed on the rear side 10a of the card 10, and is typically used in online transactions. Typically a card issuing processor verifies the CVV against the Primary Account Number (PAN) 14, a 16 digit number typically embossed into the card 10, best viewable on the front side 10a, for example, in FIG. 1A, the PAN 14 is 5412 3456 7890 1234 (with the first four to six numbers being a Bank Identification Number (BIN), for example, for the card 10, the BIN is 5412). The expiration date of the card is typically printed on the front side 10a of the card 10, for example 12-05 meaning December of 2005.

Traditionally the card transaction verification at the card issuing processor involves a balance (or credit limit) check, expiry check, CVV match against card number, and any additional fraud rules. Card data can be compromised for a variety of reasons at the user side (such as by key loggers or phishing), data breaches at issuer, acquirer or merchant, or simply susceptible to brute force attempts.

To protect against such compromises, card schemes have developed strong authentication/3D secure, which typically involves an additional step in approving card transactions, which are typically implemented, such additional static password, known to the user, or a dynamic one-time password is sent to the registered phone number. Some regulators in specific countries recommend/mandate the use of strong authentication, often based on transaction type/value thresholds. Typically this strong authentication is carried out by an Access Control Service (ACS) module, which is implemented by a provider (ACS provider). This ACS provider is integrated into the card issuer processor and facilitates the additional authentication for the card transactions.

In order to secure card transactions, when the card is not present, some cards now include a dynamic CVV. With this dynamic CVV, a chip display on the rear side or back of the card changes the CVV. In some instances, the CVV can be delivered to the user by other methods, such as short message service (SMS) or via a mobile application.

In order to comply with Payment Card Industry (PCI) regulations, typically merchants, issuers and processors, who handle card holder data (card number, CVV, expiry date), are required to meet a strict set of standards. In many instances the merchants, issuers and processors prefer to avoid the burden of PCI compliance, by working with partners who handle the raw card numbers and translate them to tokens instead.

SUMMARY OF THE INVENTION

The present invention allows card issuers/program managers to greatly increase security and eliminate online fraud while staying fully compliant with PCI without the burden of card PAN storage. The invention also protects the card issuer/program manager against CVV compromise at any other source—the user, the merchant, and/or the card issuer processor (the card processor associated with the card issuer/program manager). Further the invention also ensures that all online card transactions using CVVs are 2-factor authenticated, providing the additional benefits of verification offered by 3D secure without an actual extra redirect step.

The present invention is directed to methods and systems for payment card transactions, where a Card Verification Value (CVV) or Card Verification Code (CVC) is generated dynamically as part of a session.

The present invention is also directed to cards which lack a physical CVV located on the card itself, but rather, the CVV is created dynamically or on the fly, typically via an application. This reduces online fraud risk. As a result, even if the user loses his card, it cannot be used on-line by anyone.

Embodiments of the invention are directed to methods and systems for dynamically presenting the CVV to the user (requestor) (the terms "user" and "requestor" are used interchangeably herein, to indicate an entity, with the use of "user" and/or "requestor" depending on the stage of the process of the invention in which the entity is participating) within their phone application (app) and not on the card. The CVV does not exist until the user opens an application (app) on their trusted device, such as a smart phone, and prepares his account for a card transaction. At that point, a session is created for the user, the CVV is generated for any cards owned by the user where such cards are identified by their tokens. The CVV is available in the memory of the system of the card issuer/program manager, and is presented to the user (e.g., trusted device associated with the user) via a secure session within the application (app). This temporary CVV is short lived and only valid for the session duration. The method is Payment Card Industry (PCI) compliant, as the authorizing system, i.e., card issuer/program manager, does not have the card PAN, and the PAN is translated into a card token by another system such as with a third party processor. The card issuer/program manager is the authorizing system, and authorizes the transaction on the basis of the card token and the dynamic CVV.

The present invention allows card issuers/program managers to greatly increase security and eliminate online fraud while staying fully compliant with PCI, by utilizing a verification service, which may be independent, to verify the transaction without the burden of card PAN storage or handling on the verification service. The invention also protects the card issuer/program manager against CVV compromise at any other source—the user, the merchant, and/or the card issuer processor (the card processor associated with the card issuer/program manager). Further the invention also ensures that all online card transactions using CVVs are two (2)-factor (or 2-factor) authenticated (identified), providing the additional benefits of verification offered by 3D secure without an actual extra redirect step. The verification service, which may be independent, includes, but is not limited to a provider of an Access Control Server (ACS), which serves as a substitute for conventional 3D Secure verification such as by a one-time password sent to the phone (since the dynamically generated security code is already a one-time password, but procured pre-transaction).

The present invention is directed to methods and systems for payment card transactions, where a Card Verification Value (CVV) or Card Verification Code (CVC) is generated dynamically as part of a session relating to cardholders whose cards may be identified using tokenization.

Other embodiments of the invention include a bank or issuer provided mobile application, such as an online banking application where the CVV is made available to the user for all cards held by the cardholder (user), which are enrolled into the dynamic verification system.

Embodiments of the invention include a CVV generator application provided by a verification provider, where a user, after registration of his phone number with the verification provider, enrolls a number of participating cards into the application. The enrolment process involves confirmation with the card issuer and card issuer processor of the user's identity, which is identified by the phone number and the user's card number, which is identified by its token. Such enrolment is, for example, at the user request, or via some pre-invitation steps from the card issuer processor. Upon enrolment, the CVV is generated via the application (app) for such users would supersede the CVV on the back of the cards, and authorization requests for card transactions for such cards, would be routed via the system. For example, a user, George, could enroll into the CVV generator app his HSBC card xxxx-xxxx-xxxx-5434 and his Lloyds card xxxx-xxxx-xxxx-5232, where HSBC bank and Lloyds Bank are integrated into the verification network. After enrolment, for online transactions, the CVV on the card, is superseded by the CVV in the app, and during transaction authorization, the verification is performed by the verification system, which is implemented at, for example, HSBC bank, or, 1) its card issuer processor, or 2) its Access Control Server provider (e.g., CVV Verification Provider).

Embodiments of the invention provide a system, which is such that prior to generating the CVV, the user is first requested to confirm the specific amount or a range of amounts for which they are looking to do their next transaction, and the generated CVV is tied to the specific amount or range of amounts. Accordingly, should the CVV be correct, but the transaction amount out of range, the transaction will still be declined.

Embodiments of the invention provide a system, which is such that prior to generating the CVV, the user is first requested to confirm some information about the merchant they will pay the transaction at, and the generated CVV is tied to the specific merchant. Accordingly, should the CVV be correct, but the transaction requested by a different merchant, the transaction will still be declined.

Embodiments of the invention provide a system, which is deployed as multiple components where the verification component, which compares the currently valid CVV against the supplied CVV, is separate and outside the system of the card issuer (program manager).

Embodiments of the invention are directed to a method for processing a payment made by a payment card (e.g., debit, credit or other transaction card). The method comprises: receiving, from a device associated with a requestor (also known as a user), a request for a security code for at least one payment card assigned a unique token and which is associated with the requestor; responding to the request for the security code by authenticating the requestor, and, allowing the requestor to perform transactions using the at least one payment card. The authenticating the requestor includes: accepting a first identifier for the device, and, accepting a second identifier associated with the requestor; and, upon the authenticating of the requestor being successful: 1) generating a security code for the at least one payment card which has been assigned a unique token, 2) opening a session for the generated security code, the session open for a time period in which the generated security code is valid, and, 3) providing the generated security code to the requestor. Transaction data is received for a transaction using the at least one payment card, the transaction data including payment card information and a security code for the at least one payment card. It is then determined whether the payment card information corresponds to a payment card assigned to a unique token; and, if there is a correspondence (for example, matches), verifying the transaction for the at least one payment card, by comparing the received security code for the at least one payment card against the generated security code for the at least one payment card, provided the session for the generated security code is open.

Optionally, the method additionally comprises: assigning a unique token to the at least one payment card when the at least one payment card is issued.

Optionally, the method additionally comprises: assigning a unique token to the at least one payment card when the at least one payment card is enrolled into the dynamic CVV system. Optionally, the method is such that the second identifier includes at least one of a personal identification number (PIN) or a fingerprint.

Optionally, the method is such that the device includes a smartphone, a mobile computer, a mobile device, or a device suitable for running a client application.

Optionally, the method is such that the first identifier is a unique secret identifier associated with a device, and where a list of trusted devices is associated with each requestor.

Optionally, the method is such that should the first identifier represent a device which is not currently a trusted device for the requestor, triggering a process of establishing trust in a new device to render the new device as the trusted device. The process includes: confirmation of current access to an identification method associated with the owner of the at least one payment card, including a phone number associated with an account for the at least one payment card.

Optionally, the method is such that the generated security code includes at least one of a card verification value (CVV) or a card verification code (CVC).

Optionally, the method is such that at least one payment card includes one payment card.

Optionally, the method is such that the at least one payment card includes a plurality of payment cards.

Optionally, the method is such that should the session not be open for the generated security code, the transaction is not verified.

Optionally, the method is such that the time period for the session includes at least one of: a fixed time, or a random time within a range, and the session is closed when a new session is opened upon the generation of a new security code for the at least one payment card.

Optionally the method is such that the CVV is only valid for a single transaction and a new CVV is generated after each transaction.

Optionally the method is such that the token associated with the card number is the card number itself, where all systems dealing with the token are PCI compliant.

Optionally, the method is such that the payment associated with the payment card includes a card not present payment.

Embodiments of the invention are directed to a system for processing a payment made by a payment card. The system comprises: a first computer system, including a processor. The processor is programmed to: receive, from a device associated with a requestor, a request for a security code for at least one payment card assigned a unique token and which is associated with the requestor; respond to the request for the security code by authenticating the requestor, allowing the requestor to perform transactions using the at least one payment card, the authenticating the requestor including: accepting a first identifier for the device, and, accepting a second identifier associated with the requestor. Upon the authenticating of the requestor being successful, generating a security code for the at least one payment card which has been assigned a unique token; opening a session for the generated security code, the session open for a time period in which the generated security code is valid; and, providing the generated security code to the requestor. Transaction data for a transaction using the at least one payment card is received, with the transaction data including payment card information and a security code for the at least one payment card. It is then determined whether the payment card information corresponds to a payment card assigned to a unique token; and, if there is a correspondence, verifying the transaction for the at least one payment card, by comparing the received security code for the at least one payment card against the generated security code for the at least one payment card, provided the session for the generated security code is open.

Optionally, the system is such that the processor is programmed to determine whether the payment card information corresponds to a payment card assigned to a unique token, is further programmed to query a second computer system whether the payment card information corresponds to a payment card assigned to a unique token.

Optionally, the system is such that the second computer system includes a processor programmed to: assign a unique token to the at least one payment card when the at least one payment card is issued.

Optionally, the system is such that the generated security code includes at least one of a card verification value (CVV) or a card verification code (CVC).

Optionally, the system is such that the at least one payment card includes one payment card.

Optionally, the system is such that the at least one payment card includes a plurality of payment cards.

Optionally, the system is such that the at least one payment card includes a plurality of payment cards from a plurality of issuers.

Optionally the system is such that the CVV is tied to a specific merchant and/or a specific amount or range of amounts.

Embodiments of the invention are directed to a method for processing a payment made by a payment card. The method comprises: receiving, from a device associated with a requestor, a request for a security code for each of one or more payment cards assigned a unique token and which are associated with the requestor; responding to the request for the security code by authenticating the requestor, allowing the requestor to perform transactions using the one or more payment cards, the authenticating the requestor including: accepting a first identifier for the device, and, accepting a second identifier associated with the requestor. Upon the authenticating the requestor being successful, generating a security code for each if the one or more payment cards which have been assigned a unique token; opening a session for the generated security code, the session open for a time period in which the generated security code is valid; and, providing the generated security code to the requestor. Next, transaction data is received for a transaction using a payment card of the one or more payment cards, the transaction data including payment card information and a security code for the payment card of the one or more payment cards; determining whether the payment card information corresponds to a payment card assigned to a unique token; and, if there is a correspondence, verifying the transaction for the payment card of the one or more payment cards, by comparing the received security code for the payment card of the one or more payment cards against the generated security code for the payment card of the one or more payment cards, provided the session for the generated security code is open.

Optionally, the method is such that the one or more payment cards include all of the payment cards associated with the requestor.

Optionally, the method is such that it additionally comprises: assigning a unique token to each of the one or more payment cards when each of the one or more payment cards is issued.

Optionally, the method is such that the second identifier includes at least one of a personal identification number (PIN) or a fingerprint.

Optionally, the method is such that the device includes a smartphone, a mobile computer, a mobile device, or a device suitable for running a client application.

Optionally, the method is such that the first identifier is a unique secret identifier associated with a device, and, where a list of trusted devices is associated with each requestor.

Optionally, the method is such that, should the first identifier represent a device which is not currently a trusted device for the requestor, triggering a process of establishing trust in a new device to render the new device as the trusted device. The process includes: confirmation of current access to an identification method associated with the owner of the at least one payment card, including a phone number associated with an account for the at least one payment card.

Optionally, the method is such that the generated security code includes at least one of a card verification value (CVV) or a card verification code (CVC).

Optionally, the method is such that the one or more payment cards includes one payment card.

Optionally, the method is such that the one or more payment cards includes a plurality of payment cards.

Optionally, the method is such that, should the session not be open for the generated security code, the transaction is not verified.

Optionally, the method is such that the time period for the session includes at least one of: a fixed time, or a random time within a range, and the session is closed when a new session is opened upon the generation of a new security code for the at least one payment card.

Optionally, the method is such that the payment associated with the payment card includes a card not present payment.

Embodiments of the invention are directed to a system for processing a payment made by a payment card. The system comprises: a first computer system, including a processor. The processor is programmed to: receive, from a device associated with a requestor, a request for a security code for each of one or more payment cards assigned a unique token and which are associated with the requestor; respond to the request for the security code by authenticating the requestor, allowing the requestor to perform transactions using the one or more payment cards, the authenticating the requestor including: accepting a first identifier for the device, and, accepting a second identifier associated with the requestor. The processor is programmed such that, upon the authenticating the requestor being successful, a security code is generated for each of the one or more payment cards which have been assigned a unique token; a session is opened for the generated security code, the session open (e.g., being valid) for a time period in which the generated security code is valid; and, providing the generated security code to the requestor. Transaction data is received, by the processor, for a transaction using a payment card of the one or more payment cards, the transaction data including payment card information and a security code for the payment card of the one or more payment cards; and the processor determines: whether the payment card information corresponds to a payment card assigned to a unique token; and, if there is a correspondence, verifying the transaction for the payment card of the one or more payment cards, by comparing the received security code for the payment card of the one or more payment cards against the generated security code for the payment card of the one or more payment cards, provided the session for the generated security code is open.

Optionally, the system is such that the processor programmed to determine whether the payment card information corresponds to a payment card assigned to a unique token, is further programmed to query a second computer system whether the payment card information corresponds to a payment card assigned to a unique token.

Optionally, the system is such that the second computer system includes a processor programmed to: assign a unique token to each of the one or more payment cards when each of the one or more payment cards is issued.

Optionally, the system is such that the generated security code includes at least one of a card verification value (CVV) or a card verification code (CVC).

Optionally, the system is such that the one or more payment cards include all of the payment cards associated with the requestor.

Embodiments of the invention are directed to a method for processing a payment made by a payment card. The method comprises: receiving, from a device associated with a requestor, a request for a security code for at least one payment card assigned a unique token and which is associated with the requestor; responding to the request for the security code by authenticating the requestor, allowing the requestor to perform transactions using the at least one payment card, the authenticating the requestor including: accepting a first identifier for the device, and, accepting a second identifier associated with the requestor; upon the authenticating the requestor being successful, generating a security code for the at least one payment card which has been assigned a unique token; opening a session for the generated security code, the session open for a time period in which the generated security code is valid; and, providing the generated security code to the requestor; and, receiving, from the requestor, an indicator that the security code is to be kept active for a requestor designated time period.

Optionally, the method is such that it additionally comprises: receiving transaction data for a transaction using the at least one payment card, the transaction data including payment card information and a security code for the at least one payment card; determining whether the payment card information corresponds to a payment card assigned to a unique token; and, if there is a correspondence, verifying the transaction for the at least one payment card, by comparing the received security code for the at least one payment card against the generated security code for the at least one payment card, provided the session for the generated security code is open.

Optionally, the method is such that it additionally comprises: assigning a unique token to the at least one payment card when the at least one payment card is issued.

Optionally, the method is such that the second identifier includes at least one of a personal identification number (PIN) or a fingerprint.

Optionally, the method is such that the device includes a smartphone, a mobile computer, a mobile device, or a device suitable for running a client application.

Optionally, the method is such that the first identifier is a unique secret identifier associated with a device, and where a list of trusted devices is associated with each requestor.

Optionally, the method is such that should the first identifier represent a device which is not currently a trusted device for the requestor, triggering a process of establishing trust in a new device to render the new device as the trusted device. The process includes: confirmation of current access to an identification method associated with the owner of the at least one payment card, including a phone number associated with an account for the at least one payment card.

Optionally, the method is such that the generated security code includes at least one of a card verification value (CVV) or a card verification code (CVC).

Optionally, the method is such that the at least one payment card includes one payment card.

Optionally, the method is such that the at least one payment card includes a plurality of payment cards.

Optionally, the method is such that should the session not be open for the generated security code, the transaction is not verified.

Optionally, the method is such that the time period for the session includes at least one of: a fixed time, or a random time within a range, and the session is closed when a new session is opened upon the generation of a new security code for the at least one payment card.

Optionally, the method is such that the payment associated with the payment card includes a card not present payment.

Embodiments of the invention are directed to a system for processing a payment made by a payment card. The system comprises: a first computer system, including a processor programmed to: receive, from a device associated with a requestor, a request for a security code for at least one payment card assigned a unique token and which is associated with the requestor; respond to the request for the security code by authenticating the requestor, allowing the requestor to perform transactions using the at least one payment card, the authenticating the requestor including: accepting a first identifier for the device, and, accepting a second identifier associated with the requestor. Upon the authenticating the requestor being successful, generating a security code for the at least one payment card which has been assigned a unique token; opening a session for the generated security code, the session open for a time period in which the generated security code is valid; and, providing the generated security code to the requestor. Next, transaction data for a transaction using the at least one payment card is received, the transaction data including payment card information and a security code for the at least one payment card, and it is determined whether the payment card information corresponds to a payment card assigned to a unique token; and, if there is a correspondence, verifying the transaction for the at least one payment card, by comparing the received security code for the at least one payment card against the generated security code for the at least one payment card at a security code verification provider external to the first computer system, provided the session for the generated security code is open.

Optionally, the system is such that the processor programmed to determine whether the payment card information corresponds to a payment card assigned to a unique token, is further programmed to query a second computer system whether the payment card information corresponds to a payment card assigned to a unique token.

Optionally, the system is such that the second computer system includes a processor programmed to: assign a unique token to the at least one payment card when the at least one payment card is issued.

Optionally, the system is such that the generated security code includes at least one of a card verification value (CVV) or a card verification code (CVC).

Optionally, the system is such that the at least one payment card includes one payment card.

Optionally, the system is such that the at least one payment card includes a plurality of payment cards.

Optionally, the system is such that the plurality of payment cards are issued by a plurality of card issuers and include a plurality of access control service providers.

This document references terms that are used consistently or interchangeably herein. These terms, including variations thereof, are as follows.

A "computer" includes machines, computers and computing or computer systems (for example, physically separate locations or devices), servers, computer and computerized devices (also known as "devices" and includes "trusted devices", processors (including hardware processors), processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer. A "server" is, for example, processor based and includes, for example, machine executable instructions for the processor to run computer code for performing the various server operations.

An "application" or "APP" ("app"), includes executable software, and optionally, any graphical user interfaces (GUI), through which certain functionality may be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1A:
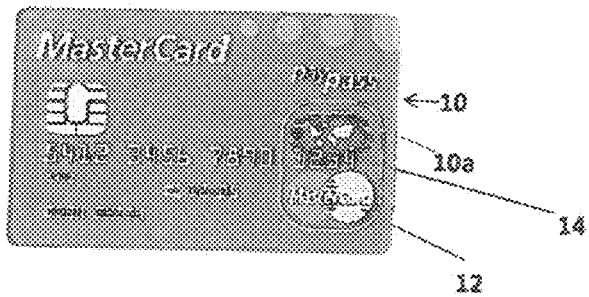
FIGS. 1A and 1B are illustrations of a conventional card, such as a credit or debit card.
Figure 1B:
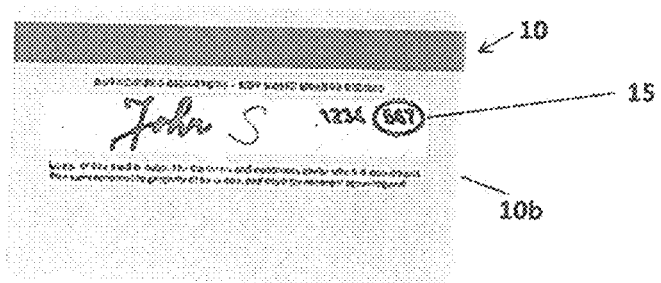

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present invention is directed to methods and systems for payment card transactions, where a Card Verification Value (CVV) or Card Verification Code (CVC) (the terms "CVV" and "CVC" used interchangeably herein) is generated dynamically and valid for a short duration, for example, a session which is open, and therefore valid, for a predetermined time period, using a unique token instead of the card number for card verification, and utilizing multi-factor authentication to create a short duration session that governs the validity of the CVV/CVC associated with the card tokens.

The present invention is directed to methods and systems for card transactions, where the card need not be present to perform the transaction, e.g., payment, also known as a "card not present" transaction or payment. The disclosed methods and systems provide a dynamic CVV, as a security code. Implementations of the invention provide all the benefits of two factor based strong authentication/3D secure, in a manner where no one party including the issuer has access to the card, and the CVV, at any single time, post transaction.

The disclosed methods and systems dynamically generate a CVV and verify a transaction, such that when there is a valid session for a user (requestor) (the terms "user" and "requestor" are used interchangeably herein, to indicate an entity, with the use of "user" and/or "requestor" depending on the stage of the process of the invention in which the entity is participating), who possesses a card identified by its token, a dynamic CVV is generated, which can be used to verify the token of a card. This enables CVV verification on the card without any single party in the transaction processing chain other than the user, not even the verifying issuer, actually possessing all the details required to complete a transaction. These details include, for example, the card PAN and CVV and card expiry date. Additionally, not only is the CVV dynamic, but it is linked to the login session, which makes the CVV nonexistent when a session does not exist, which negates brute force attacks.

Also, the underlying session for the user can only be created on the basis of two factor verification of a user using a supporting identity: using a PIN (what they know) and a trusted device (what they have) where trust is established for a device by additionally verifying the identity of the user during the first session with a new non-trusted device. The additional verification could be done such as by verifying current access to the primary phone number linked to the user by sending a one-time password to the user. Successful verification results in linking the device as a trusted device for the user, the device being identified by a persistent device identifier which could be a hard to counterfeit hardware attribute of the device, or a server generated hard to guess unique fingerprint which is provided to the device after verification. Suitable trusted devices include, smartphones or mobile computers, mobile devices and other devices suitable for running client applications.

The present invention provides methods and systems that generate a CVV, i.e., a security code, with the generated CVV linked to a session and a card token. The CVV does not exist when the user is not logged-in to a session, and the card token or token, is linked to the CVV when the user is logged in to the session. The CVV is not directly linked to the card number or PAN.

The methods and systems of the present invention require that: 1) the user (represented such as by their phone number), must be logged in into a session to generate the CVV; and, 2) the system of login is based on a trusted device (phone) and a secret PIN or other personal identity, such as a touch identification (ID), e.g., fingerprint which is known/possessed by the user.

For example, should an imposter attempt to generate the CVV for a user, then the imposter needs to be able to get the user's trusted phone (or to know the unique secret device identifier assigned to the user's trusted phone by the server to impersonate the user's phone) and then to login using the user's identifier (phone number) and the user's PIN. Alternately, the imposter needs access to the user's sim card and their PIN in order to be able to login like that of the user on a new phone. Accordingly, the CVV is tied to the login, which is tied to a trusted device.

Figure 2A:
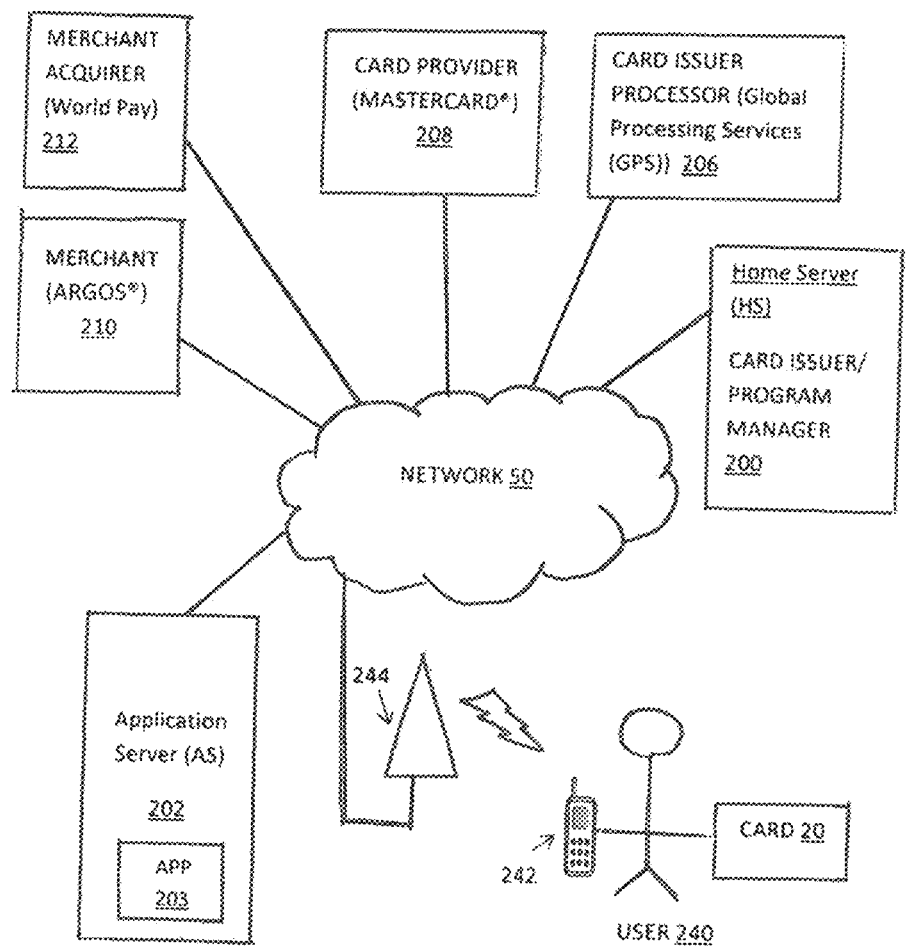
FIG. 2A is a diagram of an exemplary environment for the system in which embodiments of the disclosed subject matter are performed.

Reference is now made to FIG. 2A, which shows an exemplary operating environment, including a network 50, to which is linked a home server (HS) 200, also known as a main server. The home server 200 also defines a system, either alone or with other, computers, including servers, components, and applications, e.g., client applications, associated with either the home server 200, as detailed below. The home server 200 and its system belong or are associated with, for example, to a card issuer/program manager, which manages cards for financial transactions, such as credit cards, debit cards and other types of payment cards (collectively referred to as "cards" in this document). The home server 200 includes components, which form a system (or a portion of a system) for issuing tokens corresponding to cards, issuing CVVs (security codes) and controlling timing of sessions in which CVVs are valid, linking tokens to CVVs and performing matching of tokens for cards which the card issuer/program manager has issued, databases and other storage media for storing CVVs, tokens, card numbers, for example, as masked data, and processors (including, for example, hardware processors) for controlling the aforementioned. The home server 200 and system perform additional functions detailed below.

The network 50 is, for example, a communications network, such as a Local Area Network (LAN), or a Wide Area Network (WAN), including public networks such as the Internet. The network 50 is either a single network or a combination of networks and/or multiple networks, including also (in addition to the aforementioned communications networks such as the Internet), for example, cellular networks. "Linked" as used herein includes both wired or wireless links, either direct or indirect, and placing the computers, including, servers, components and the like, in electronic and/or data communications with each other.

The other servers linked to the network 50 include, for example, an application server 202, a card issuer/processor server 206, a card provider server 208, a server 210, representative of a merchant, and a server 210 of a merchant acquirer 212, the merchant acquirer for processing the merchant's card transactions. A user (requestor) 240 links to the network 50 via his trusted device, such as a smartphone 242, via a cellular tower 244. The user 240 also holds the card 20 of the present invention, of which an example card operation is detailed in FIGS. 3A-3D below.

This application server 202 stores and makes accessible, to devices, computers and the like, via the network 50, for example, by downloading, an application (APP) 203 of the present invention. This application (APP) 203, when installed and running on a trusted device, such as the smartphone 242 of the user 240, maps to the home server 200. The application 203 as installed on a device, e.g., smartphone 242, is discussed in operation below.

A server 206 belongs to or is associated with the Card Issuer Processor (for example, Global Processing Services FZLLC of Dubai UAE (GPS)), an entity who processes card transactions for the card issuer/program manager. This server 206 is linked to the network 50. This server 206 performs operations for receiving and processing various card data, including CVV's and card PANs, along with other data, creating and augmenting tokens, as well as performing other operations detailed below. This server 206 also includes, for example, databases and other storage media for cards and their PANs.

Server 208 belongs to or is associated with a card provider. An example card provider is MASTERCARD®. The server 208, for example, for MASTERCARD®, the card provider, is associated with a BIN (bank identification number), for example, the BIN of MASTERCARD®.

The server 210 represents servers of merchants, for example, ARGOS® (Argos Ltd. of Milton Keynes UK, www.argos.co.uk). Server 212 is the Merchant Acquirer's server, which processes card payment transactions for the merchant. The server 212 is, for example, the merchant acquirer, WorldPay (Payment Processing Services www-.worldpay.com).

Figures 1, 2B:
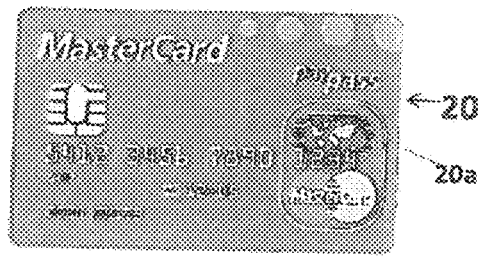
FIGS. 2B-1 and 2B-2 are illustrations of a card used in accordance with the embodiments of the present invention as shown in FIG. 2A.
Figures 2, 2B:
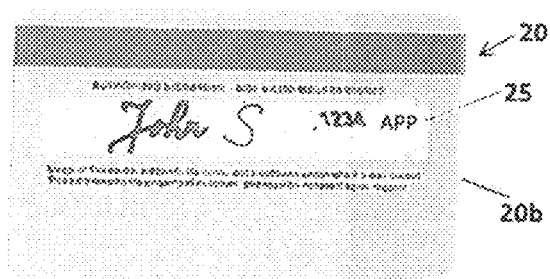
Figure 3A:
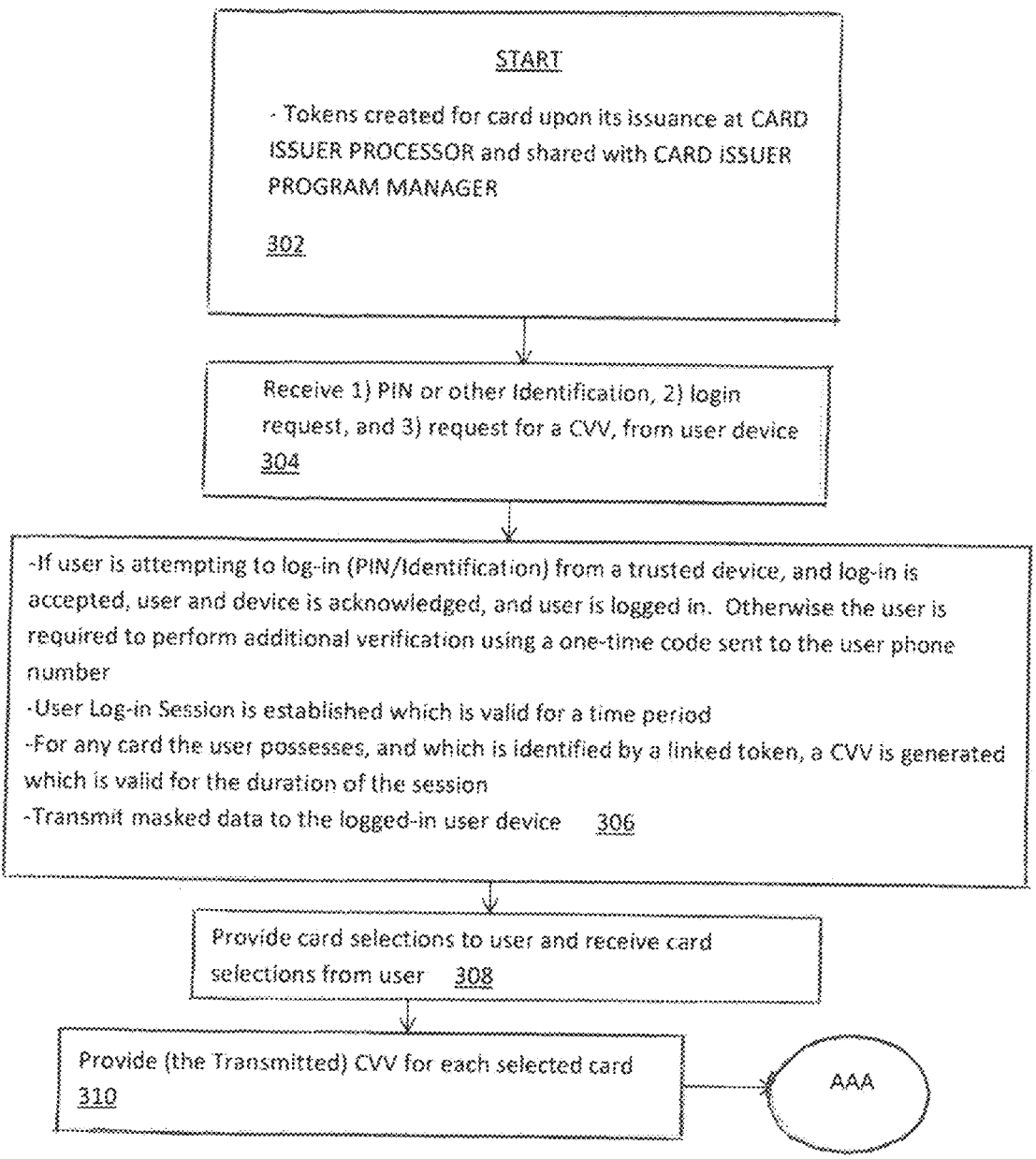
FIGS. 3A-3D are a flow diagram of processes in accordance with embodiments of the present invention.
Figure 3B:
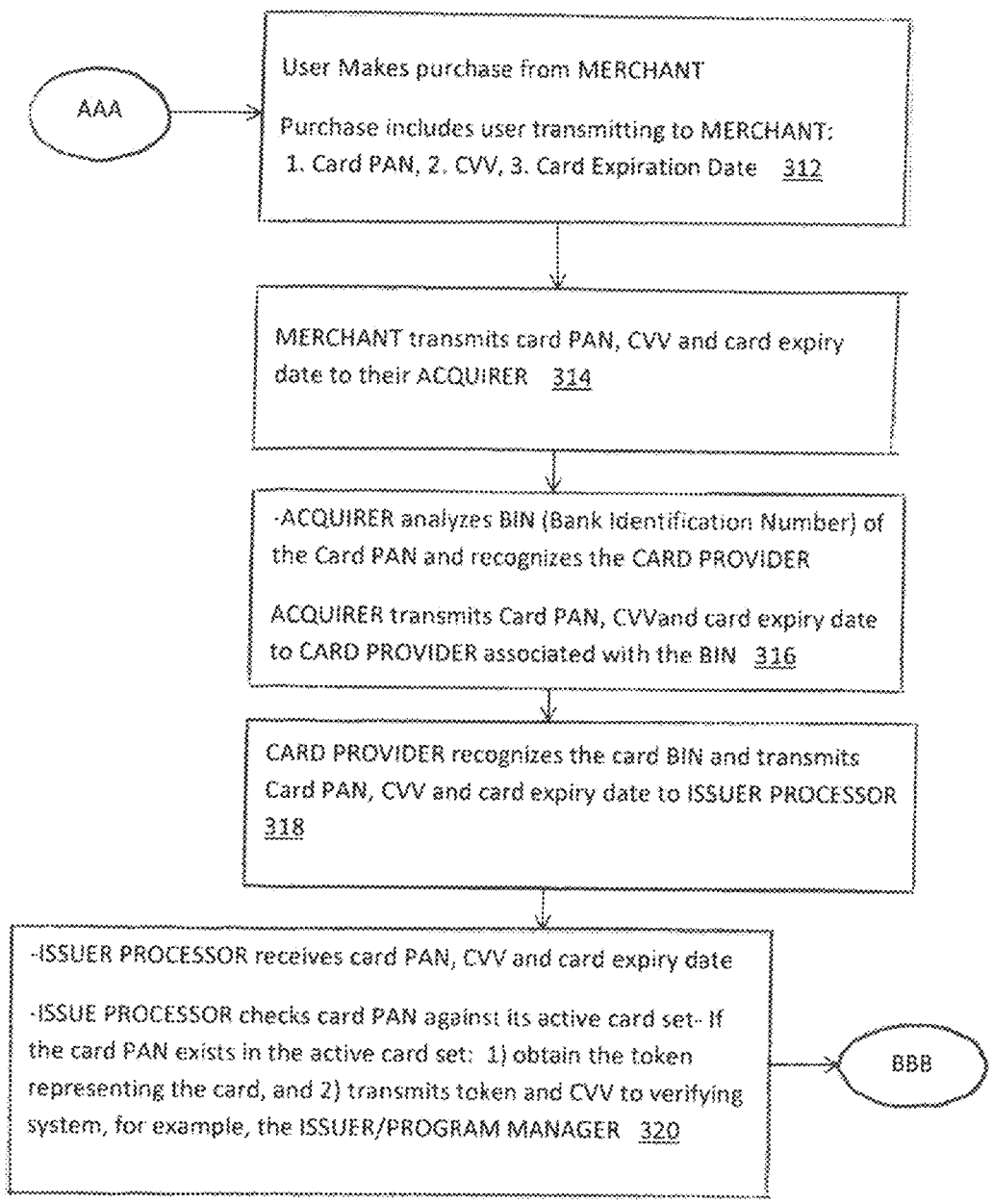
Figure 3C:
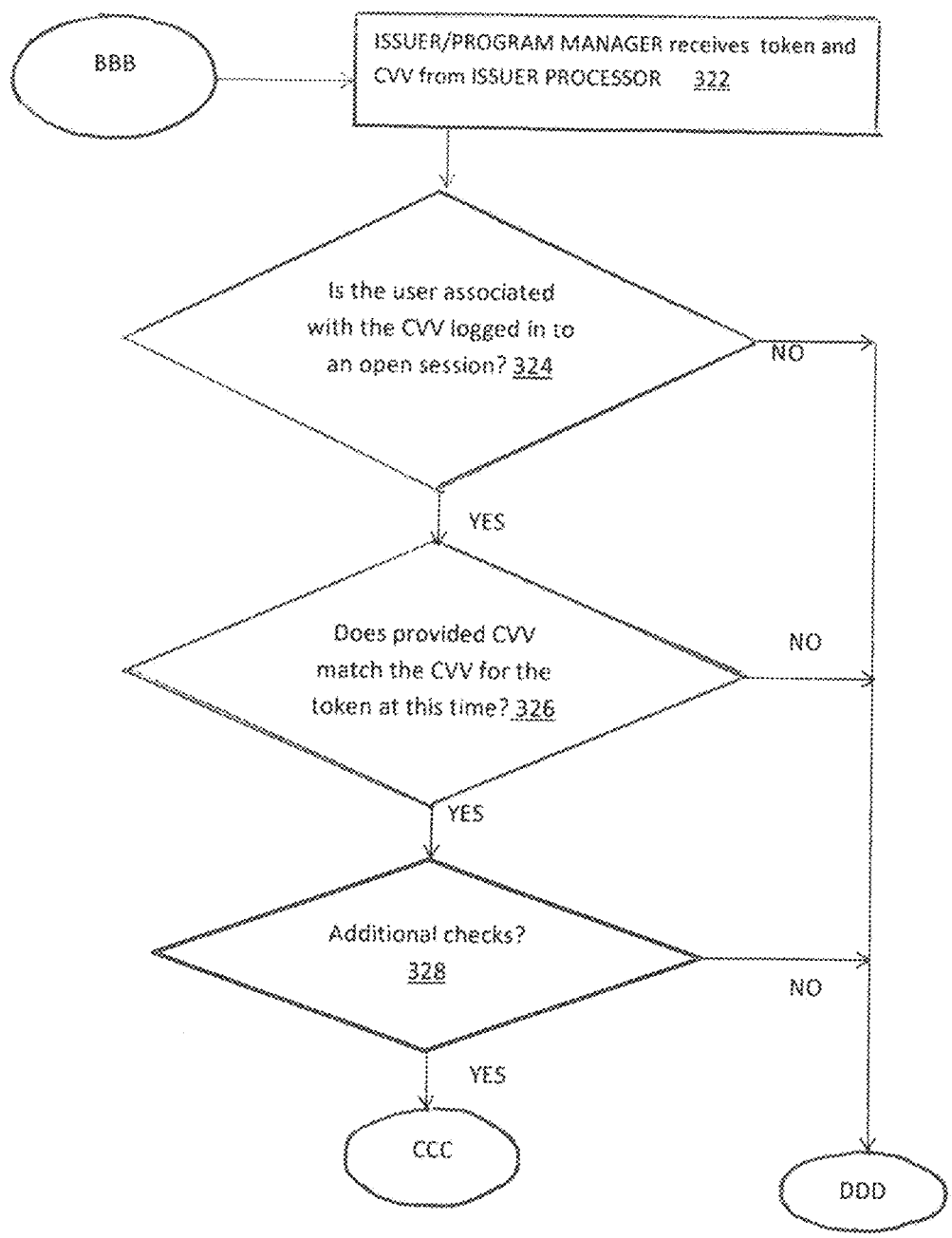
Figure 3D:
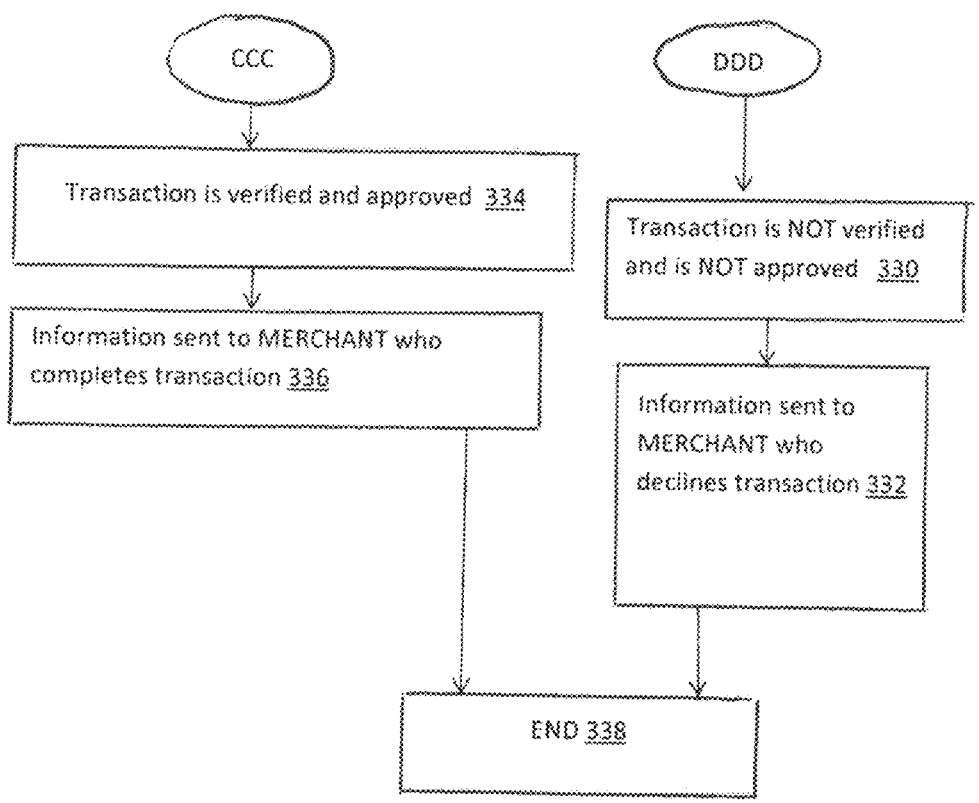

The user 240 is in possession of his trusted device 242, i.e., his smartphone, and card 20. The card 20 is shown in FIGS. 2B-1 and 2B-2. In addition to the PAN (including the BIN) and expiration date on the front side 20a of the card 20, on the rear side 20b, there is not a conventional CVV number. Rather, there is the word "APP" 25 in place of the CVV, or alternately, the CVV is not present on the card 20. The card 20 is, for example, a payment card, and may be a credit or debit card.

Attention is now directed to FIGS. 3A-3D, collectively known as FIG. 3, which show a flow diagram detailing computer-implemented processes in accordance with embodiments of the disclosed subject matter. Reference is also made to elements shown in FIGS. 2A, 2B-1 and 2B-2. The process and subprocesses of FIGS. 3A-3D are computerized processes performed by the system. The aforementioned processes and sub-processes are, for example, performed automatically and in real time. However, the processes can be permed manually as well and in combination with automatic processes.

In FIGS. 3A-3D and in the description of these figures below, the various parties associated with the transaction are indicated based on the server of FIG. 2A represented and/or associated with that particular entity. For example, the entity card issuer/program manager, represented and/or associated with the home server 200, is indicated as CARD ISSUER/PROGRAM MANAGER 200. Similarly, the entity card issuer processor, represented and/or associated with the server 206, is indicated as CARD ISSUER PROCESSOR 206. The entity card provider, represented and/or associated with the server 208, is indicated as CARD PROVIDER 208. The entity merchant, represented and/or associated with the server 210, is indicated as MERCHANT 210, and the entity merchant acquirer, represented and/or associated with the server 212, is indicated as MERCHANT ACQUIRER 212.

Prior to the START block 302 of the process detailed in FIG. 3, the application 203 has been obtained, e.g., by downloading from the application server 202, over the network 50, and installed by the user 240 on his trusted device, i.e., smartphone 242.

At the START block 302, tokens (also known as unique tokens, as each token is unique for a single issued card) are created and assigned for the card upon its issuance at the CARD ISSUER PROCESSOR 206 and shared with the CARD ISSUER/PROGRAM MANAGER 200. The process moves to block 304, where the CARD ISSUER/PROGRAM MANAGER 200 receives, from a user 240, also known as a requestor (e.g., a trusted device associated with the requestor): 1) a PIN (Personal Identification; 2) a login request, and, 3) a request for a CVV, from the device 242 (e.g., trusted device) of the requestor 240.

The process moves to block 306, where the user (requestor) 240 is attempting to log-in from a trusted device 242 (based on a unique secret device identifier) and with a user/requestor identifier, such as a PIN or other personal Identification or other identifier, such as a Touch ID (e.g., a fingerprint), which is known/available only to the user. For example, the trusted device 242 is from a list of trusted devices associated with each requestor. Should the log-in be accepted, the requestor (user) and the trusted device are acknowledged (by the CARD ISSUER/PROGRAM MANAGER 200), and the requestor (user) is logged in. This is a two factor identification, as the trusted device is identified, for example, via the unique secret device identifier, the first factor, and, the requestor (user) is identified via a user/requestor identifier such as the PIN, the second factor.

Also, should the first identifier of the two factor identification (authentication) for the trusted device represent a device which is not currently a trusted device (e.g., from a list of trusted devices associated with the requestor) for the requestor (user), this triggers a process of establishing trust in a new device to render the new device as the trusted device. This process includes, for example, confirming the current access to an identification method associated with the owner of the payment card(s), including a phone number associated with an account for the payment card(s).

For example, the user (requestor) 240 attempts to log in using their phone number such as "+447624222721" and their PIN "3234" from device 242. The unique secret device identifier (e.g., a long string value "asddad1314553636363663" which uniquely identifies the device 242) is automatically submitted to the CARD ISSUER/PROGRAM MANAGER 200 with the login request. The CARD ISSUER/PROGRAM MANAGER 200 checks whether "asddad1314553636363663" matches the currently valid trusted device identifier for the user represented by phone number "+447624222721". Further the CARD ISSUER/PROGRAM MANAGER 200 also checks whether the PIN "3234" (entered by the user (requestor) 240) matches the PIN for the user represented by phone number "+447624222721". If the PIN is valid but the device 242 (represented by unique secret device identifier "asddad1314553636363663") is not trusted, a onetime password is sent (for example, by the CARD ISSUER/PROGRAM MANAGER 200), for example, by short message service (SMS) to the user's (requestor's) 240 phone number+ 447624222721. Providing the one time password results in the current device 242 (identified by secret identifier "asddad1314553636363663") becoming the trusted device for user 240. If the device is a trusted device and the PIN is valid, the login is successful and a session is generated.

With the user (requestor) log-in verified and approved (authenticated), a user log-in session (for the authenticated user/requestor) is established (e.g., opened), the session being open and valid for a time period, as set by the CARD ISSUER/PROGRAM MANAGER 200. For any card the user possesses (including all cards possessed by the user/requestor), and which is identified by a linked or otherwise assigned token (unique token), a CVV (e.g., as a security code) is generated which is valid for the duration of the session. The opening of the session and the generation of the security code are performed contemporaneous in time, and may be performed in any order or simultaneously. The session may be, for example, of a fixed time, a random time within a time range. Further, a session is closed when a new session is opened such as by a new login, resulting in the generation of a new security code (CVV/CVC) for the same card(s), e.g., payment card(s).

The process moves to block 308, where the user is provided card selections of his cards from the CARD ISSUER/PROGRAM MANAGER 200, and the user selections for the card(s) are received, for example, by the CARD ISSUER/PROGRAM MANAGER 200. At block 310, the generated CVV(s) (as security code(s)) is/are transmitted to the user device 242 (e.g., from the server 200 to the client (device) 242) for each selected card (one or more cards of a user/requestor, including all of the cards for the user/requestor) together with a masked card number, for example, 5434-xxxx-xxxx-9456, and card expiry date.

Moving to block 312, the user 240, via the device 242 makes a card 20 purchase from a MERCHANT 210, for example, ARGOS®. The purchase includes the user 240 transmitting to, and the MERCHANT 210 receiving transaction data including at least: 1) the card PAN, 2) the CVV, and 3) the card expiry (expiration) date. The process moves to block 314, where the MERCHANT 210 transmits the transaction data including, for example, 1) the card PAN, 2) the CVV, and 3) the card expiry (expiration) date, to the MERCHANT ACQUIRER 212, for example, WorldPay Secure Payment Processing (WorldPay Group PLC of London UK, www.worldpay.com), who, for example, may work with ARGOS® to process ARGOS's card transactions.

The process moves to block 316, where the MERCHANT ACQUIRER 212 analyzes the BIN (Bank Identification Number) of the card PAN and recognizes the CARD PROVIDER. The MERCHANT ACQUIRER 212 transmits the transaction data, for example, the Card PAN, CVV, and card expiry date, to the CARD PROVIDER server 208, i.e., MASTERCARD®, associated with the BIN. The process moves to block 318, where the CARD PROVIDER 208 recognizes the card BIN and transmits the transaction data, e.g., the Card PAN, CVV and card expiry date, to ISSUER PROCESSOR 206.

At block 320, the ISSUER PROCESSOR 206 receives card PAN, CVV and card expiry date, and checks the card PAN against its active card set (stored, for example in a database or other storage media including cloud storage). If the card PAN exists in the active card set, the ISSUE PROCESSOR 206: 1) obtains the token representing the card, and 2) transmits the token and the CVV to the verifying system, for example, the CARD ISSUER/PROGRAM MANAGER 200.

The process moves to block 322, where the CARD ISSUER/PROGRAM MANAGER 200 receives the token and the CVV from the ISSUER PROCESSOR 206.

Moving to block 324, the first of a series of checks (e.g., comparisons) is now made by the CARD ISSUER/PROGRAM MANAGER 200. Here, it is determined whether the user (requestor) associated with the token is logged in to an open session. If an open session does not exist (a "no" at block 324), the process moves to block 330, where the transaction is not verified and is not approved. From block 330, the process moves to block 332, where the information is sent to the MERCHANT 210, who declines the transaction, and the process ends at block 338.

If yes at block 324, the process moves to block 326, where it is determined whether the provided (received) CVV matches the CVV (generated) for the token (i.e., the token/unique token assigned to the card/payment card), for the session active at this time. If no at block 326, the process moves to block 330 and subsequently blocks 332 and 338 as detailed above. If yes at block 326, the process moves to block 328, where additional checks are made.

These additional checks at block 328 include, for example, one or more of balance availability, card limits checks, fraud rules, and the like. However, these additional checks are optional, such that block 328 does not need to be part of the process. Should any of the additional checks not be passed, the process moves to block 330 and subsequently blocks 332 and 338 as detailed above. Should all additional checks be passed, the process moves to block 334, where the transaction is verified and approved.

From block 334, the process moves to block 336, where the information of the accepted transaction is sent to the MERCHANT 210, who completes the transaction. The process moves to block 338, where it ends.

The processes of blocks 324, 326 and 328 are shown in an exemplary order only. The processes of these blocks may be performed in any order, as these processes are performed, for example, contemporaneous in time, and may be performed simultaneously.

Also, should block 328 not be performed, as it is optional, if yes at block 326 (or block 324 if the order of blocks 324 and 326 was reversed), the process would move to block 334, where the transaction is verified and approved (and then to blocks 336 and 338 as detailed above).

Reference is now made to FIGS. 4 and 5A-5D, which show another embodiment of the invention in an exemplary operating environment (FIG. 4), and an example process (FIGS. 5A-5D) performed in this environment. This embodiment is similar to that shown in FIG. 2A (where similar elements are numbered identically or similarly and are in accordance with their descriptions above), but is different, in that a separate CVV Verification Provider (represented by the server 400, and referred to hereinafter as CVV Verification Provider 400) is linked to the network(s) 50. The CVV verification provider 400 is a separate entity, for example, not controlled by or related to any of the other entities of FIG. 4, all of which are described in FIG. 2A above, except where indicated.

Figure 4:
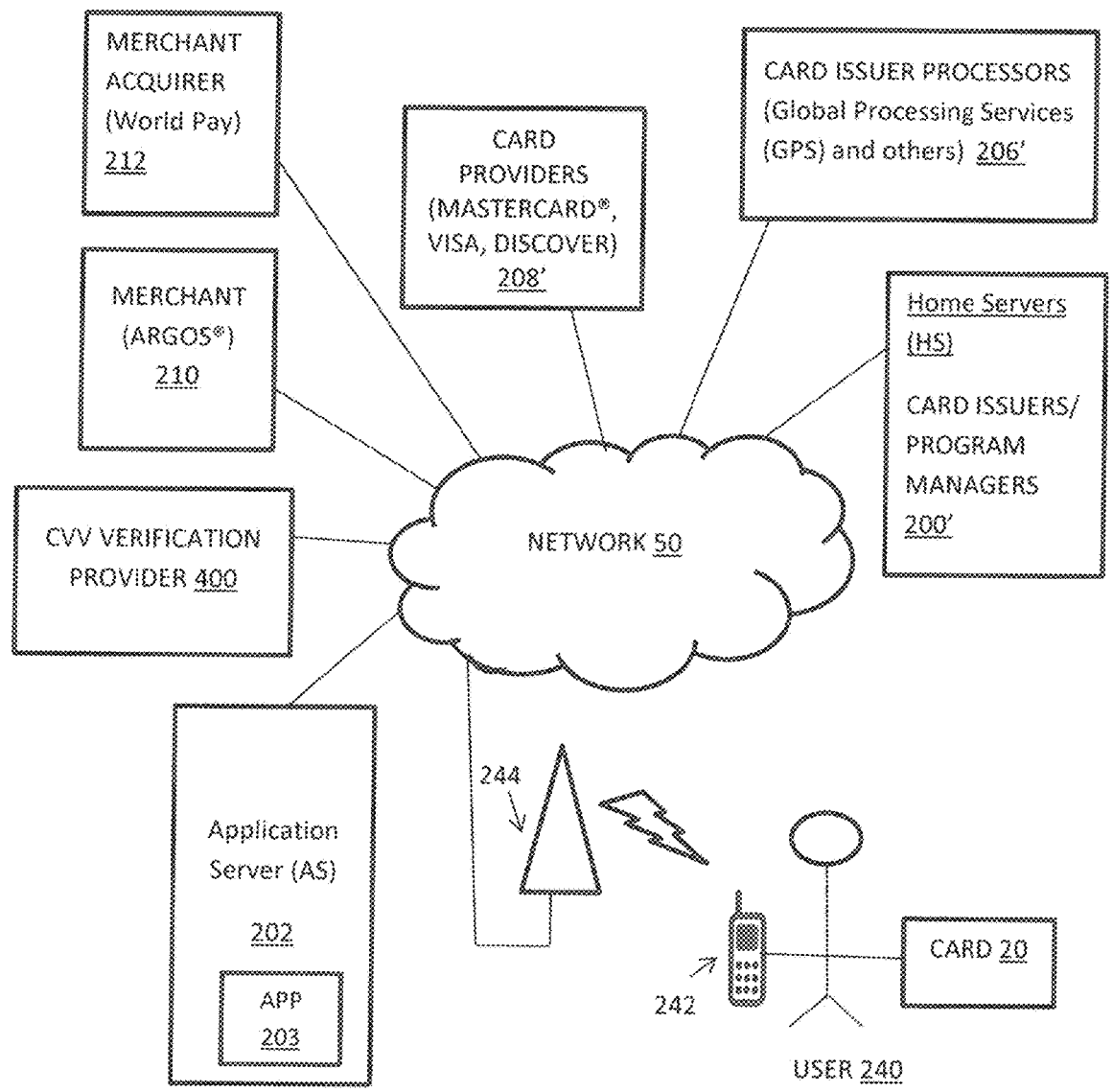
FIG. 4 is a diagram of another exemplary environment for the system in which embodiments of the disclosed subject matter are performed; and, FIGS. 5A-5D are a flow diagram of processes in accordance with embodiments of the present invention in the environment of FIG. 4.

Additionally, in the environment of FIG. 4, there are, for example, multiple home servers 200', similar to the home server 200 for each Card Issuer/Program Manager, each home server 200' representative of a Card issuer/Program Manager for each card of the user 240, represented by a token. (A single home server 200' may be for multiple cards of the user, provided the cards are controlled by that Card issuer/Program Manager, e.g., two VISA cards from Wells Fargo® Bank). The Card Issue Processors 206', are similar to Card Issuer Processors 206, but server 206' represents multiple servers for multiple Card Issue Processors, and the server 208' is similar to the server 208, but represents multiple servers for multiple card providers, e.g., MASTERCARD, VISA, DISCOVER, AMERICAN EXPRESS, DINERS, etc., as a typical user 240 has multiple cards, each represented by a token, from multiple different issuers 200'. The Card Issuer/Program Managers 200', application server 202, Card Issuer Processors 206', Card Providers 208' and CVV Verification Provider 400, for example, form a dynamic verification system.

FIGS. 5A-5D show an example process performed in the environment of FIG. 4. This process is directed to an outside CVV verification provider 400 and its operation, and that the user 240 has one or more cards, and when the user 240 has more than one card, the cards may be from different card issuers/program mangers 200'.

In FIGS. 5A-5D and in the description of these figures below, the various parties associated with the transaction are indicated based on the server of FIG. 4 represented and/or associated with that particular entity. For example, the entity card issuer/program manager, represented and/or associated with the home server(s) 200', is indicated as CARD ISSUERS/PROGRAM MANAGERS 200', and may be a separate entity for each card issued, so that there may be multiple CARD ISSUERS/PROGRAM MANAGERS. The CARD ISSUERS/PROGRAM MANAGERS 200' may be, for example, banks, such as Bank of America®, Wells Fargo®, Lloyds®, HSBC®, and the like. Similarly, the entity card issuer processors, represented and/or associated with the server 206', is indicated as CARD ISSUER PROCESSORS 206', and may be, for example, Global Processing Services (GPS), banks which do their own card processing, and the like. The entity card providers, represented and/or associated with the server 208', is indicated as CARD PROVIDERS 208' (e.g., MasterCard®, Visa®, Discover®, American Express®, Diners®). The entity merchant, represented and/or associated with the server 210, is indicated as MERCHANT 210, and the entity merchant acquirer, represented and/or associated with the server 212, is indicated as MERCHANT ACQUIRER 212. The entity CVV Verification Provider represented and/or associated with the server 400, is indicated as CVV VERIFICATION PROVIDER 400.

Figure 5A:
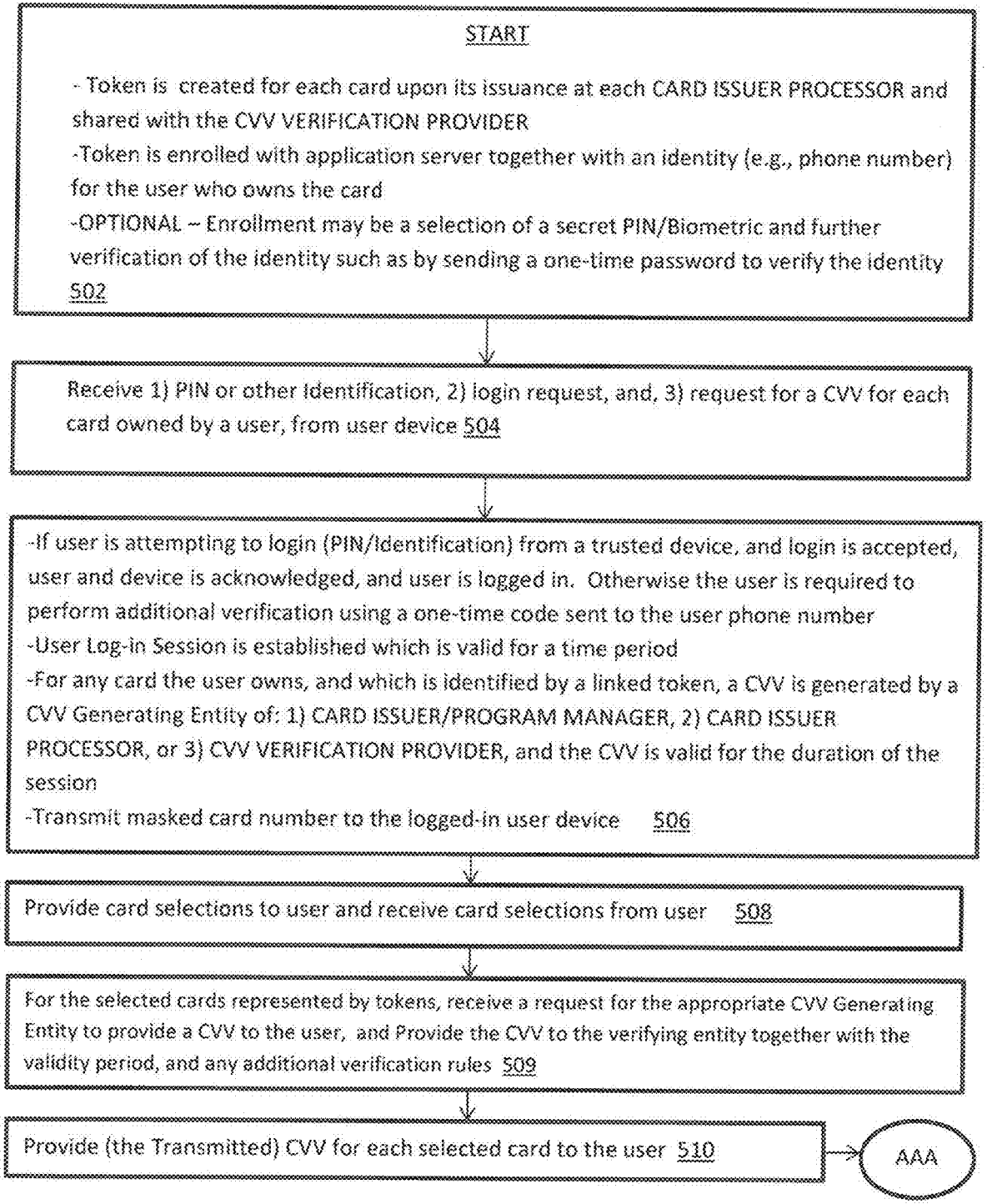
Figure 5B:
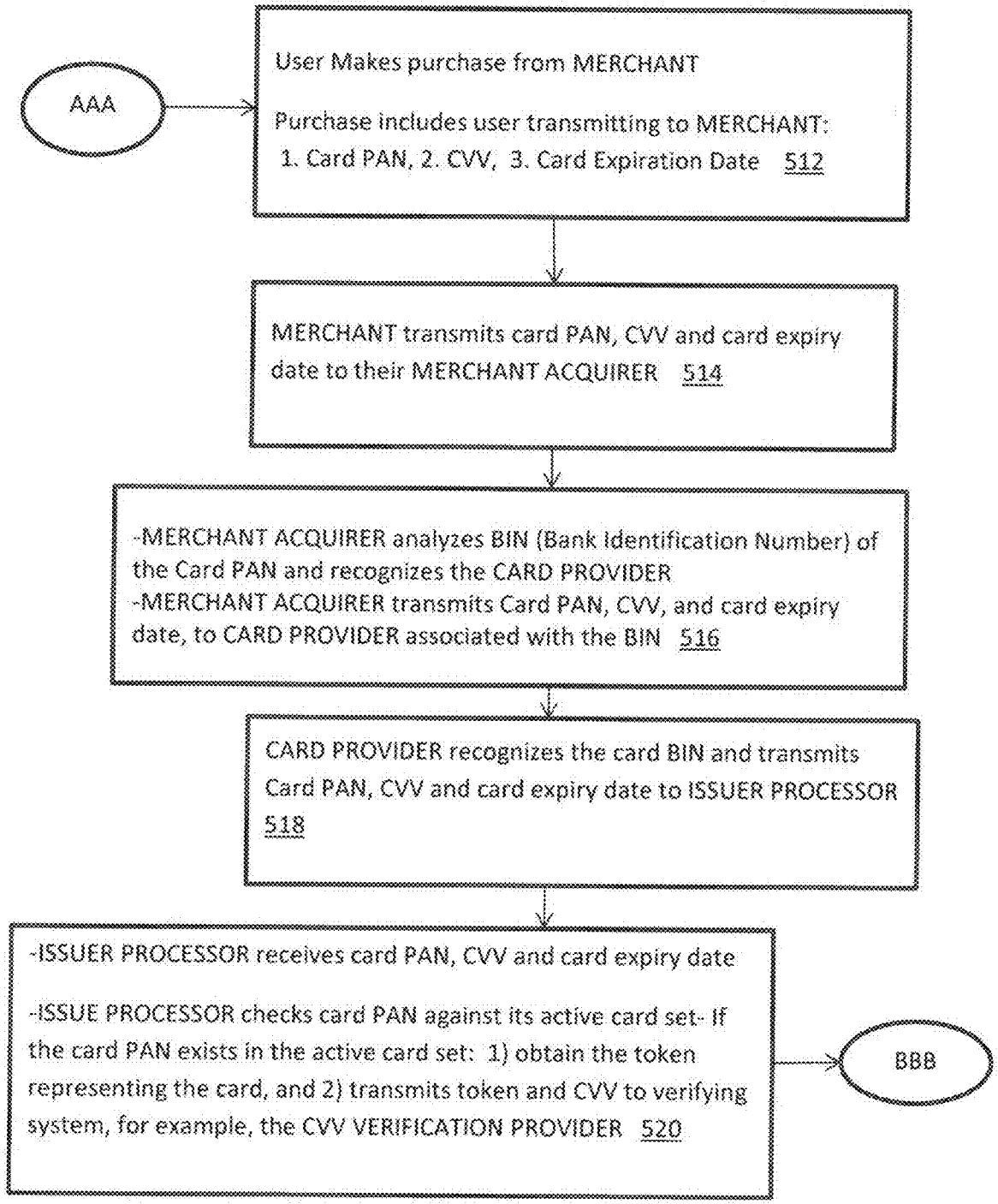
Figure 5C:
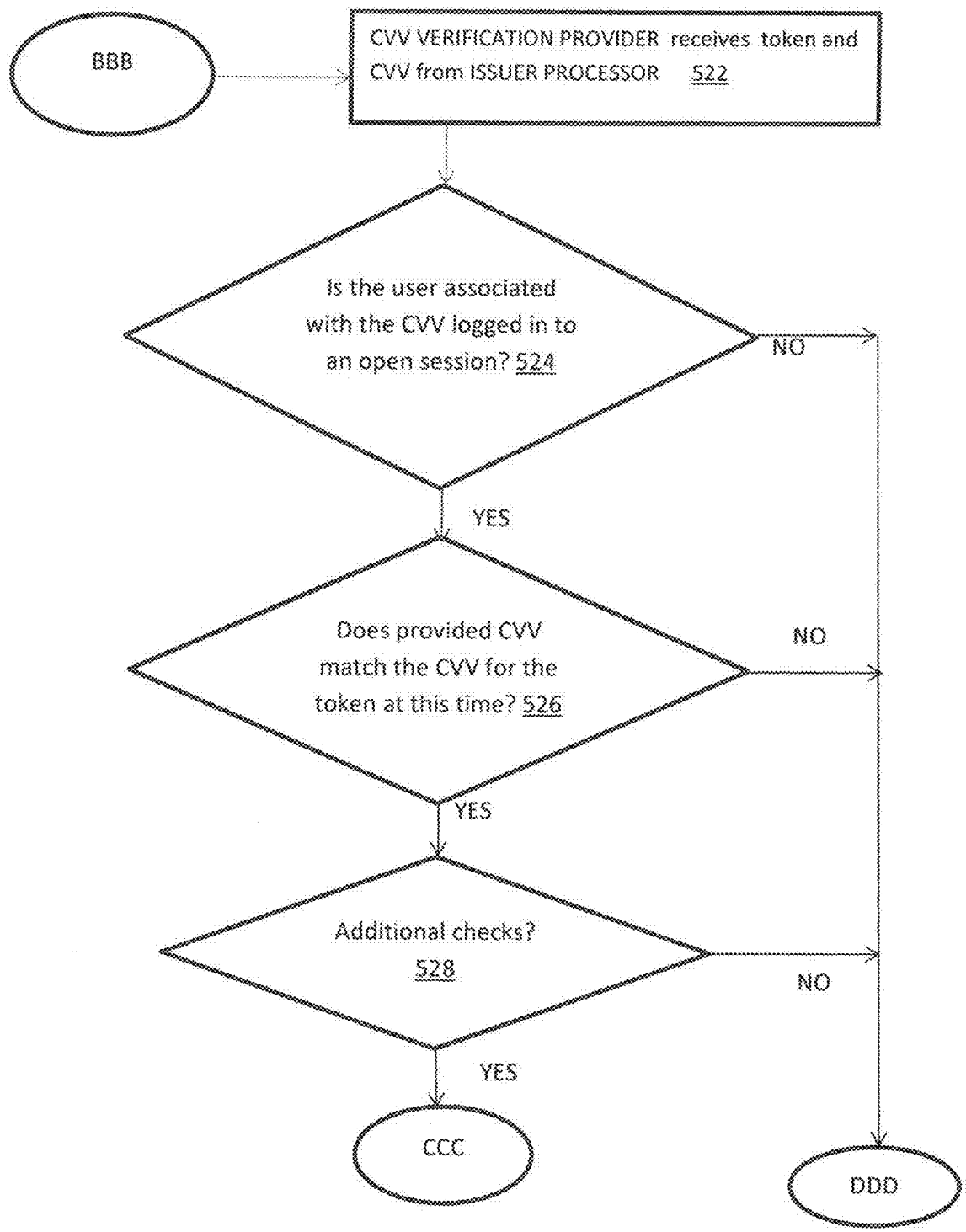
Figure 5D:
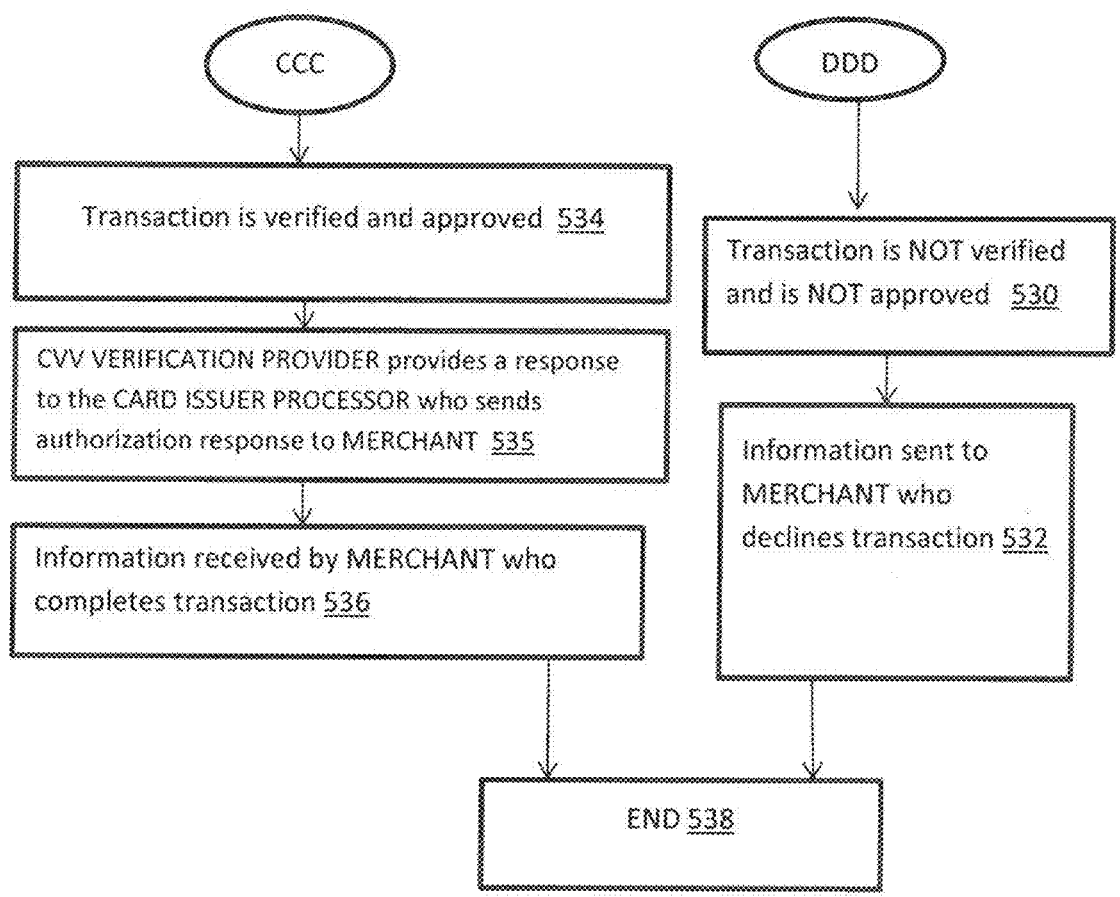

Prior to the START block 502 of the process detailed in FIG. 5A, the application (APP) 203 has been obtained, e.g., by downloading from the application server 202, over the network 50, and installed by the user 240 on his trusted device, i.e., smartphone 242.

At the START block 502, a token (also known as unique tokens, as each token is unique for a single issued card) is created and assigned for each the card upon its issuance at the respective CARD ISSUER PROCESSOR 206' and shared with the CVV VERIFICATION PROVIDER 400. Each token is enrolled with the application server 202 together with an identity (e.g., phone number for the user 240 who owns the card. Optionally, the enrollment may be a selection of a secret PIN/Biometric and further verification of the identity of the user, such as by sending a one-time password from the respective CARD ISSUER/PROGRAM MANAGER 200' to the user 240, to verify the identity and enroll the user into the dynamic verification system.

The process moves to block 504, where the CARD ISSUER/PROGRAM MANAGER 200, (or by its delegation, the Application server 202) associated with the specific card of the user 240, receives, from the user 240, also known as a requestor (e.g., a trusted device associated with the requestor): 1) a PIN (Personal Identification; 2) a login request, and, 3) a request for a CVV for each card owned by the user 240, from the device 242 (e.g., trusted device) of the user/requestor 240.

The process moves to block 506, where the user (requestor) 240 is attempting to log-in from a trusted device 242 (based on a unique secret device identifier) and with a user/requestor identifier, such as a PIN or other personal Identification or other identifier, such as a Touch ID (e.g., a fingerprint), which is known/available only to the user. For example, the trusted device 242 is from a list of trusted devices associated with each requestor. Should the log-in be accepted, the requestor (user) and the trusted device are acknowledged (by the CARD ISSUER/PROGRAM MANAGER 200'), and the requestor (user) is logged in. This is a two (2) factor identification, as the trusted device is identified, for example, via the unique secret device identifier, the first factor, and, the requestor (user) is identified via a user/requestor identifier such as the PIN, the second factor.

Also, should the first identifier of the two factor identification for the trusted device represent a device which is not currently a trusted device (e.g., from a list of trusted devices associated with the requestor) for the requestor (user), this triggers a process of establishing trust in a new device to render the new device as the trusted device. This process includes, for example, confirming the current access to an identification method associated with the owner of the payment card(s), including a phone number associated with an account for the payment card(s).

A User Log-in Session is now established which is valid for a time period. For any card the user owns, and which is identified by a unique token, having been issued for the card, a CVV is generated by a CVV Generating Entity, for example: 1) a CARD ISSUER/PROGRAM MANAGER 200', 2) a CARD ISSUER PROCESSOR 206', or 3) the CVV VERIFICATION PROVIDER 400. The CVV (which was generated) is valid for the duration of the session. The masked card number, for example, 5434-xxxx-xxxx-9456, and card expiry date, is transmitted, for example, from the CARD ISSUER/PROGRAM MANAGER 200' (or by its delegation, the application server 202), to the logged-in user device 242.

The process moves to block 508, where the user is provided card selections of its cards from each CARD ISSUER/PROGRAM MANAGER 200' (or by its delegation, the application server 202), for each card owned by the user 240, and the user selections for the card(s) are received, for example, by the respective CARD ISSUER/PROGRAM MANAGER 200' (or by its delegation, the application server 202), which communicates data to the application server 202.

The process moves to block 509, where, for the selected cards represented by tokens, a request is received from the application server 202 for the appropriate CVV Generating Entity to provide a CVV to the user, and to provide the CVV to a verifying entity, for example, any one of: the CVV VERIFICATION PROVIDER 400, CARD ISSUER PROCESSOR 206', CARD ISSUER/PROGRAM MANAGER 200', application server 202, together with the validity period, and any additional verification rules.

At block 510, the generated CVV(s) (as security code(s)) for each selected card is/are provided to the user 240. For example, the generated CVV(s) are transmitted to the user device 242 (e.g., from the server 200' to the client (device) 242) for each selected card (one or more cards of a user/requestor 240).

In an optional subprocess, after block 510, for example, the user may freeze their dynamically generated CVV (security code) for a certain point in time, to ensure that the card will work without interruption in situations: 1) where the user's device 242 does not have access to the Internet or other communications network to generate a new code, 2) the user 240 must provide details to a MERCHANT 210, who will charge the transaction at a later time to the generation of the CVV, and/or, 3) the MERCHANT 210 may charge the transaction at a later time to the generation of the CVV. In these situations, the user 240, via device 242, transmits a message to the server 200', which ultimately notifies the CVV verification entity (listed above).

Moving to block 512, the user 240, via the device 242, makes a card 20 purchase from a MERCHANT 210, for example, ARGOS®. The purchase includes the user 240 transmitting to, and the MERCHANT 210 receiving transaction data including at least: 1) the card PAN, 2) the CVV, and 3) the card expiry (expiration) date (and typically the currency used for the purchase and the amount of the purchase). The process moves to block 514, where the MERCHANT 210 transmits the transaction data including, for example, 1) the card PAN, 2) the CVV, and 3) the card expiry (expiration) date, to the MERCHANT ACQUIRER 212, for example, WorldPay Secure Payment Processing (WorldPay Group PLC of London UK, www.worldpay.com), who, for example, may work with ARGOS® to process ARGOS's card transactions.

The process moves to block 516, where the MERCHANT ACQUIRER 212 analyzes the BIN (Bank Identification Number) of the card PAN and recognizes the CARD PROVIDER 208'. The MERCHANT ACQUIRER 212 transmits the transaction data, for example, the Card PAN, CVV, and card expiry date, to the corresponding CARD PROVIDER server 208', for the card being used in the transaction, i.e., MASTERCARD®, associated with the BIN. The process moves to block 518, where the CARD PROVIDER 208' (for the card used for the transaction) recognizes the card BIN and transmits the transaction data, e.g., the Card PAN, CVV and card expiry date, to ISSUER PROCESSOR 206', for the card being used for the transaction.

At block 520, the CARD ISSUER PROCESSOR 206' receives the card PAN, CVV and card expiry date, and checks the card PAN against its active card set (stored, for example in a database or other storage media including cloud storage). If the card PAN exists in the active card set, the CARD ISSUE PROCESSOR 206': 1) obtains the token representing the card, and 2) transmits the token and the CVV to the verifying system (detailed above), for example, the CVV VERIFICATION PROVIDER 400.

The process moves to block 522, where the CVV VERIFICATION PROVIDER 400 receives the token and CVV from the CARD ISSUER PROCESSOR 206'.

Moving to block 524, the first of a series of checks (e.g., comparisons) is now made by the CVV VERIFICATION PROVIDER 400. Here, it is determined whether the user (requestor) associated with the token is logged in to an open session. If an open session does not exist (a "no" at block 524), the process moves to block 530, where the transaction is not verified and is not approved. From block 530, the process moves to block 532, where the information is sent to the MERCHANT 210, who declines the transaction, and the process ends at block 538.

If yes at block 524, the process moves to block 526, where it is determined whether the provided (received) CVV matches the CVV (generated) for the token (i.e., the token/unique token assigned to the card/payment card), for the session active at this time. If no at block 526, the process moves to block 530 and subsequently blocks 532 and 538 as detailed above. If yes at block 526, the process moves to block 528, where additional checks are made.

These additional checks at block 528 include, for example, one or more of balance availability, card limits checks, fraud rules, additional rules that could tie the CVV to a specific amount/range of amounts selected by the user, or that could tie the CVV to a specific payee, and the like. However, these additional checks are optional, such that block 528 does not need to be part of the process. Should any of the additional checks not be passed, the process moves to block 530 and subsequently blocks 532 and 538 as detailed above. Should all additional checks be passed, the process moves to block 534, where the transaction is verified and approved.

From block 534, the process moves to block 535, where the CVV VERIFICATION PROVIDER 400 provides a response to the CARD ISSUER PROCESSOR 206', for the card of the transaction, who sends an authorization response to the MERCHANT 210. The process then moves to block 536, where the information of the accepted transaction is received by the MERCHANT 210, who completes the transaction. The process moves to block 538, where it ends.

The processes of blocks 524, 526 and 528 are shown in an exemplary order only. The processes of these blocks may be performed in any order, as these processes are performed, for example, contemporaneous in time, and may be performed simultaneously.

Also, should block 528 not be performed, as it is optional, if yes at block 526 (or block 524 if the order of blocks 524 and 526 was reversed), the process would move to block 534, where the transaction is verified and approved (and then to blocks 535, 536 and 538 as detailed above).

Optionally, the dynamic verification system is such that prior to generating the CVV, the user is first requested to confirm the specific amount or a range of amounts for which they are looking to do their next transaction, and the generated CVV is tied to the specific amount or range of amounts. Accordingly, should the CVV be correct, but the transaction amount is out of range, the transaction will still be declined.

Optionally, the dynamic verification system is such that prior to generating the CVV, the user is first requested to confirm some information about the merchant they will pay the transaction at, and the generated CVV is tied to the specific merchant. Accordingly, should the CVV be correct, but the transaction was requested by a different merchant, the transaction will still be declined.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for processing a payment made by a payment card, by a first computer system including one or more computers, the method comprising:

receiving, by a computer of the first computer system, from a device associated with a requestor, a request for a security code for at least one payment card assigned a unique token, the unique token generated by a token generator associated with the issuance of the at last one payment card, and which is associated with the requestor;

a computer of the first computer system, responding to the request for the security code by authenticating the requestor, and, allowing the requestor to perform transactions using the at least one payment card, the authenticating the requestor including:
  accepting and verifying a first identifier for the device, and, accepting and verifying a second identifier associated with the requestor;
upon the authenticating of the requestor being successful, generating, by a code generator, a security code for the at least one payment card, the security code associated with the unique token assigned to the at least one payment card;
  opening a time-based session for the generated security code associated with the unique token, the opening of the time-based session including activating timing circuitry in a computer of the first computer system, such that the session is open for a time period of a set length as designated by the requestor, and in which the generated security code is valid for performing transactions using the at least one payment card during the time period of the time-based session; and,
  providing the generated security code to the requestor for the at least one payment card, the generated security code valid for the time period of the time-based session; and
receiving, from the requestor, an indicator that the security code is to be active for a time period designated by the requestor, the requestor designated time period corresponding to the set length of the time-based session;
wherein the payment card transactions made by the requestor using the at least one payment card are valid, based on a token matching process, including matching of the security codes, between a token received from a payment transaction and the unique token assigned to the at least one payment card, while the time-based session, for the generated security code for the at least one payment card, is open.

2. The method of claim 1, additionally comprising:
a computer of a second computer system:
  receiving transaction data for a transaction using the at least one payment card, the transaction data including a security code for the at least one payment card;
  determining whether the received transaction data including the security code corresponds to the generated security code for the at least one payment card assigned, to which the unique token is assigned; and,
  if there is a correspondence, verifying the transaction for the at least one payment card, provided from the first computer system for the time-based session, for the generated security code, is open.

3. The method of claim 2, wherein the computer of the first computer system assigns the unique token to the at least one payment card when the at least one payment card is issued.

4. The method of claim 2, wherein the second identifier includes at least one of a personal identification number (PIN) or a fingerprint.

5. The method of claim 4, wherein the device includes a smartphone, a mobile computer, a mobile device, or a device suitable for running a client application.

6. The method of claim 5, wherein the first identifier is a unique secret identifier associated with a device, and where a list of trusted devices is associated with each requestor.

7. The method of claim 5, wherein, should the first identifier represent a device which is not currently a trusted device for the requestor, triggering a process of establishing trust in a new device to render the new device as the trusted device, the process including:
  confirmation of current access to an identification method associated with the owner of the at least one payment card, including a phone number associated with an account for the at least one payment card.

8. The method of claim 1, wherein the generated security code includes at least one of a card verification value (CVV) or a card verification code (CVC).

9. The method of claim 2, wherein the at least one payment card includes one payment card.

10. The method of claim 2, wherein the at least one payment card includes a plurality of payment cards.

11. The method of claim 2, wherein should the session not be open for the generated security code, the transaction is not verified.

12. The method of claim 2, wherein the payment associated with the payment card includes a card not present payment.

13. A system for processing a payment made by a payment card comprising:
a first computer system, including a processor programmed to:
  receive, from a device associated with a requestor, a request for a security code for at least one payment card assigned a unique token, the unique token generated by a token generator during the issuance of the at least one payment card, and which is associated with the requestor;
  respond to the request for the security code by authenticating the requestor, allowing the requestor to perform transactions using the at least one payment card, the authenticating the requestor including:
    accepting and verifying a first identifier for the device, and,
    accepting and verifying a second identifier associated with the requestor;
  upon the authenticating the requestor being successful, generating, by a code generator, a security code for the at least one payment card, the security code associated with the unique token assigned to the at least one payment card;
    opening a time-based session for the generated security code, the opening of the time-based session including activating timing circuitry in a computer of the first computer system, such that the session open for a time period of a set length in which the generated security code is valid for performing transactions using the at least one payment card, and
    providing the generated security code to the requestor for the at least one payment card, the generated security code valid for the time period of the time-based session;
  receive transaction data for a transaction using the at least one payment card, the transaction data including a security code for the at least one payment card,
  determine whether the received transaction data corresponds to a payment card, to which the unique token is assigned; and,
  if there is a correspondence, verifying the transaction for the at least one payment card, by comparing the received security code in the received transaction data for the at least one payment card, against the generated security code for the at least one payment card, at a security code verification provider external to the first computer system, provided the time-based session for the generated security code is open.

14. The system of claim 13, wherein the processor programmed to determine whether the payment card information corresponds to a payment card assigned to a unique token, is further programmed to query a second computer system whether the received transaction data corresponds to the payment card to which the unique token is assigned.

15. The system of claim 14, wherein the second computer system includes a processor programmed to: assign the unique token to the at least one payment card when the at least one payment card is issued.

16. The system of claim 13, wherein the generated security code includes at least one of a card verification value (CVV) or a card verification code (CVC).

17. The system of claim 16, wherein the at least one payment card includes one payment card.

18. The system of claim 16, wherein the at least one payment card includes a plurality of payment cards.

19. The system of claim 18, wherein the plurality of payment cards are issued by a plurality of card issuers and include a plurality of access control service providers.

* * * * *